June 16, 1964 A. N. T. ST. JOHN ET AL 3,137,319
HOSE CONSTRUCTION
Filed March 21, 1962
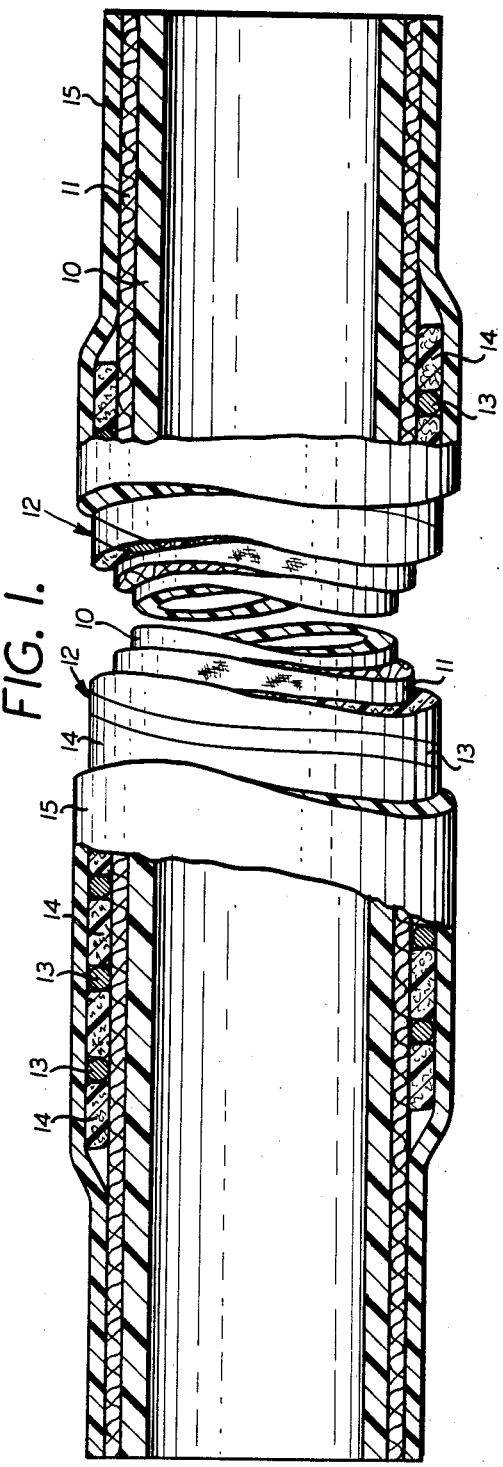
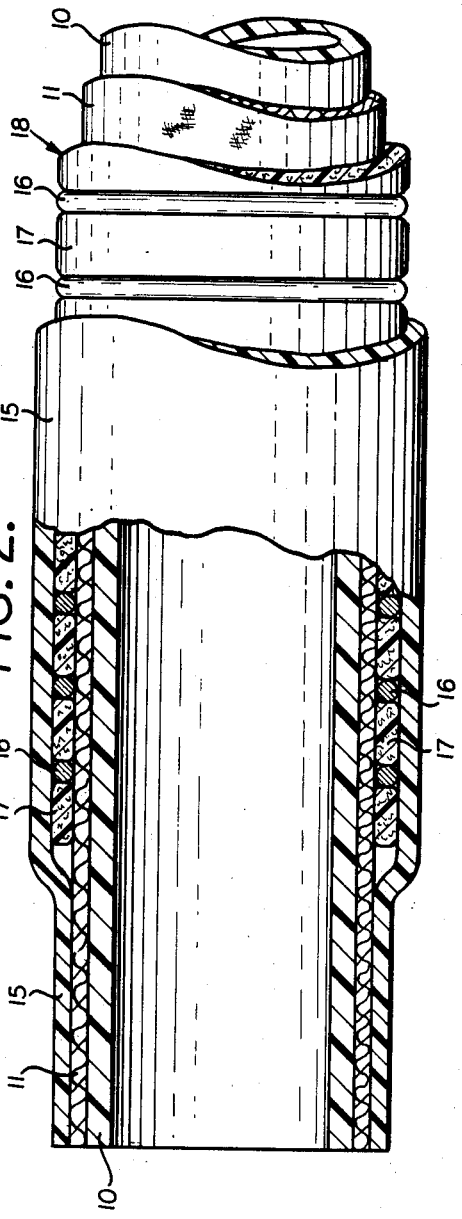
INVENTORS
ALEXANDER N. T. ST. JOHN
STANLEY M. CONNOR
BY
Byerly, Townsend, Watson & Churchill
ATTORNEYS.

United States Patent Office 3,137,319
Patented June 16, 1964

3,137,319
HOSE CONSTRUCTION
Alexander N. T. St. John, Glen Ridge, and Stanley M. Connor, Pompton Lakes, N.J., assignors to Resistoflex Corporation, Roseland, N.J., a corporation of New York
Filed Mar. 21, 1962, Ser. No. 181,422
2 Claims. (Cl. 138—132)

This invention relates to a new hose construction and more particularly to a hose especially suited for handling liquid coolants in large capacity electric power generators.

In large commercial or industrial electric power generators it is necessary to circulate cooling liquids through various parts of the structure to prevent overheating. Because of the working conditions encountered the liquid conduits must have an extremely high electrical resistance, an ability to withstand low amplitude high frequency vibration, and both high burst and collapse strength.

Extremely high electrical resistance is required of the hose because it must exist in an environment characterized by both high voltages and strong magnetic fields. The hose must be free from conductive materials in order not to give rise to the generation of eddy currents with the concomitant production of heat. At the same time, the presence of conductive materials is accompanied by the danger of a short circuit. Naturally, the restriction with respect to the use of metals is a handicap in the production of a hose both resistant to collapse under external pressure and having high burst strength.

Certain parts of the generator structure can not be cooled by the circulation of liquid. Consequently, it is also the practice to circulate hydrogen (its specific heat is about 14½ times greater than air) throughout the generator structure. The hydrogen is kept under slight pressure to ensure that all leakage is outward thereby avoiding the development of an explosive air and hydrogen mixture. During operation the hydrogen pressure within the generator may be of the order of 60 p.s.i.

It will be understood that once one of these large generators is placed in operation, shut-down for maintenance becomes a costly proposition. For this reason generators are designed to operate for long periods of time without breakdown. For example, a generator coolant hose of the type considered herein is expected to have a service life of 20 to 25 years. Naturally, it is necessary to consider all possible contingencies. If for any reason there should occur a loss in hydrogen pressure, the hose must be capable of withstanding the full internal fluid pressure without bursting. On the other hand, if there should be a loss of coolant pressure the hose must be capable of withstanding the external hydrogen pressure of 60 p.s.i. without collapsing. A further requirement imposed upon a coolant hose of this type is the need for continuous operation in an environment wherein the temperature may be of the order of 180° F. or higher.

It is the purpose of the present invention to provide a hose with all of the capabilities required of a generator coolant hose as specified in the foregoing.

The above purpose is achieved in accordance with the present invention by providing a generator coolant hose in which the hose body comprises a tubular lining of homogeneous plastic material, reinforced if necessary, to provide a liquid tight core resistant to radial expansion but having comparatively little resistance to radial collapse under an externally applied crushing force, a layer of dielectric material surrounding the core, the dielectric material having sufficient body strength to be resistant to radial collapse but having an articulable construction which gives rise to bending flexibility, and an outer jacket of homogeneous plastic material closely surrounding the layer of dielectric material, the hose body being entirely free from metallic material.

More specifically, the layer of dielectric material may be in the form of a flexible reinforcing layer including axially spaced rings which are sandwiched between inner and outer flexible tubes of a heat softenable resin.

The invention will be better understood after reading the following detailed description with reference to the appended drawings in which:

FIG. 1 is a pictorial representation partly in section and partly broken away to show the construction of one embodiment of the invention; and FIG. 2 is a view similar to FIG. 1 and illustrates another embodiment of the invention.

Referring now to FIG. 1 a generator coolant hose embodying the invention is shown as comprising a tubular lining 10 of sintered polytetrafluoroethylene resin sheathed in a braided sleeve 11 of synthetic filamentary material to provide a fluid tight core resistant to radial expansion but having comparatively little resistance to radial collapse. A layer designated generally by the numeral 12 of dielectric material surrounds the core. The layer 12 is formed from alternating rings 13 of an elastomeric material and rings 14 of a glass fabric laminate bonded with a thermoset resin thereby having sufficient body strength to be resistant to radial collapse while retaining bending flexibility. The hose is completed by the provision of an outer jacket of sintered polytetrafluoroethylene resin 15 which closely surrounds the layer of dielectric material 12. In order to provide for the assembly of fittings to the ends of the hose the dielectric layer is arranged to extend throughout the hose body with the exception of a short portion at each end.

The two tubes of polytetrafluoroethylene resin are prepared preferably by the process disclosed and claimed in United States Patent No. 2,752,637 issued on July 3, 1956 to the assignee of the present application. In accordance with the teachings of the aforesaid patent the lining 10 and jacket 15 are produced by extruding a mixture of fine polytetrafluoroethylene powder, an organic liquid lubricant, and a lubricant absorbent material, followed by sintering.

The lining 10 is next jacketed with the reinforcing sheath 11 which may be produced by braiding synthetic threads or fibers directly thereon. It is presently preferred to employ filamentary material produced from fibers made by the condensation of dimethyl terephthalate and ethylene glycol (presently marketed under the registered trademark "Dacron" by the DuPont Company).

In the embodiment now being described the rings of dielectric material 13 and 14 each form part of a respective continuous helix. That is, the rings 13 are part of a continuous length of silicone rubber cord; the rings 14 are part of a flat spring or helix of glass fabric bonded in a laminar structure by the use of a thermoset resin, preferably one of the epoxies.

A convenient way of producing the helix which includes the rings 14 is to first produce a continuous tube of the resin-bonded glass fabric. This can be done by winding woven glass tape upon a mandrel with the addition of an appropriate epoxy resin in liquid form which cures or sets due either to catalytic action or the application of heat. Processes for producing such tubes are well known and form no part of the present invention. After the continuous tube is fabricated it can then be machined, for example, by application of a cutting tool while the tube is rotating on a screw machine, to produce the spiral or helix.

The helix containing the rings 14 can now be twisted in such a way as to open its internal diameter whereupon it is slipped over the sheath 11. The turns of the helix are then positioned to give equal spacing of the rings 14 and correct overall length. Next, the silicone rubber cord is pressed into the space between the rings or turns 14 using some tension so it will give a snug fit. The ends of the rubber cord may then be held in place by small pieces of pressure sensitive tape or the like. In a typical hose construction the layer 12 may have a wall thickness approximating ⅛ inch.

With the layer 12 in place the outer cover 15 with an internal diameter slightly under size is expanded by the application of heat until it can be slipped over the outside of the layer 12. It is then allowed to cool whereupon it shrinks snugly into place about the layer 12, as shown in the drawing.

The embodiment illustrated in FIG. 1 may, on occasion, provide some difficulty in assembly. In such case, it may be preferred to employ annular rings in the reinforcing layer 12 rather than rings of a helix or spiral. This is illustrated in FIG. 2 by the alternating rings 16 and 17 which make up the layer of dielectric material 18. The rings 16 may be formed from silicone rubber while the rings 17 are formed from resin-bonded glass fabric much in the same way as previously described with reference to FIG. 1. The only difference is that instead of machining the continuous tube into a flat helix it is cut into separate rings. The other components of the hose shown in FIG. 2 are the same as those shown in FIG. 1 and bear the same refernce numerals.

It will be understood by those skilled in the art that numerous changes may be made in the construction of the hose in accordance with the present invention without departing from the true spirit thereof as defined in the appended claims. For example, the silicone rubber may be replaced by any other elastomeric material having good aging properties, heat resistance and resiliency.

What is claimed is:

1. A generator coolant hose in which the hose body comprises a tubular lining of sintered polytetrafluoroethylene resin sheathed in a braided sleeve of synthetic filamentary material to provide a fluid tight core resistant to radial expansion but having comparatively little resistance to radial collapse under an externally applied crushing force, a layer of dielectric material surrounding said core, said layer being formed from alternating rings of an elastomeric material and rings of a glass fabric laminate bonded with a thermoset resin thereby having sufficient body strength to be resistant to radial collapse while retaining bending flexibility, and an outer jacket of sintered polytetrafluoroethylene resin closely surrounding said layer of dielectric material, the hose body being entirely free from metallic material.

2. A generator coolant hose in which the hose body comprises a tubular lining of sintered polytetrafluoroethylene resin to provide a fluid tight core resistant to radial expansion but having comparatively little resistance to radial collapse under an externally applied crushing force, a layer of dielectric material surrounding said core with the exception of a short portion to each end but not bonded adherently thereto, said layer being formed from alternating rings of an elastomeric material and rings of a substantially rigid dielectric material, the latter having sufficient body strength to be resistant to radial collapse to a greater extent than said lining, while said layer has bending flexibility, and an outer jacket of sintered polytetrafluoroethylene resin surrounding said layer of dielectric material and the exposed ends of said lining both with a shrink fit but without being bonded adherently thereto, the hose body being entirely free from metallic material.

References Cited in the file of this patent

UNITED STATES PATENTS

| | | |
|---|---|---|
| 1,352,740 | Egerton | Sept. 14, 1920 |
| 2,383,733 | Parker | Aug. 28, 1945 |
| 2,424,863 | Swain | July 29, 1947 |
| 2,825,364 | Cullen et al. | Mar. 4, 1958 |
| 2,991,808 | Siegmann et al. | July 11, 1961 |

FOREIGN PATENTS

| | | |
|---|---|---|
| 836,203 | Great Britain | June 1, 1960 |
| 231,085 | Australia | Nov. 3, 1960 |

UNITED STATES PATENT OFFICE
CERTIFICATE OF CORRECTION

Patent No. 3,137,319            June 16, 1964

Alexander N. T. St. John et al.

It is hereby certified that error appears in the above numbered patent requiring correction and that the said Letters Patent should read as corrected below.

Column 3, line 27, for "refernce" read -- reference --; column 4, line 17, for "to" read -- at --.

Signed and sealed this 10th day of November 1964.

(SEAL)
Attest:

ERNEST W. SWIDER
Attesting Officer

EDWARD J. BRENNEl
Commissioner of Patents